United States Patent [19]

Johnson

[11] 4,228,066

[45] Oct. 14, 1980

[54] STABILIZED POLYMER COMPOSITIONS

[75] Inventor: Burnett H. Johnson, Baytown, Tex.

[73] Assignee: Exxon Research & Engineering Co., Florham Park, N.J.

[21] Appl. No.: 29,597

[22] Filed: Apr. 12, 1979

[51] Int. Cl.$^2$ .............. C08K 5/42; C08K 5/13; C07F 15/00

[52] U.S. Cl. .................. 260/45.75 C; 260/438.1

[58] Field of Search ............ 260/45.75 C, 429 J, 260/438.1; 264/216

[56] References Cited

U.S. PATENT DOCUMENTS

| | | | |
|---|---|---|---|
| 2,976,259 | 3/1961 | Hardy et al. | 260/45.85 B |
| 2,989,416 | 6/1961 | Standish | 260/45.75 G |
| 3,049,503 | 8/1962 | Milionis et al. | 260/45.95 F |
| 3,075,850 | 1/1963 | Kibler et al. | 260/45.95 F |
| 3,098,863 | 7/1963 | Dessouer et al. | 260/429 J |
| 3,200,086 | 8/1965 | Coleman | 260/45.85 B |
| 3,264,335 | 8/1966 | Smallwood et al. | 260/429 J |
| 3,415,875 | 12/1968 | Luethi et al. | 260/45.75 R |
| 3,635,905 | 1/1972 | Patton | 528/49 |
| 3,772,354 | 11/1973 | Fredricks et al. | 260/45.75 C |
| 4,022,751 | 5/1977 | Johnson | 260/45.75 C |
| 4,029,684 | 6/1977 | Avar et al. | 260/45.75 C |

FOREIGN PATENT DOCUMENTS 821001  8/1969  Canada.

OTHER PUBLICATIONS

CA-vol. 71 (1969), 82165k.

*Primary Examiner*—V. P. Hoke
*Attorney, Agent, or Firm*—Myron B. Kurtzman

[57] ABSTRACT

Copper chelates of 2-hydroxybenzophenones useful as UV light absorbers are employed to stabilize organic compositions such as polymer compositions against degradation on embrittlement on exposure to UV light.

16 Claims, No Drawings

STABILIZED POLYMER COMPOSITIONS

BACKGROUND OF THE INVENTION

1. Field of the Invention

This invention relates to organic compositions stabilized against degradation upon exposure to light. More particularly, the present invention relates to the discovery of new UV absorbers for organic compositions. More specifically, certain copper chelates of 2-hydroxybenzophenones have been discovered to be useful UV light absorbers for organic compositions such as polymer compositions. More specifically, certain polymer compositions such as polyparabanic acids, poly(iminoimidazolidinediones), polyurethanes, polyureas, polyesters, polyamides, polyimides, polycarbonates, polyhydantoins and polymers containing one or more moieties characteristic of these polymers can be stabilized against degradation upon exposure to light by adding to the polymers copper chelates of 2-hydroxybenzophenones. The invention further relates to the method of preparing organic compositions which are stabilized against degradation upon exposure to light.

2. Description of the Prior Art

In U.S. Pat. No. 4,022,751 entitled STABILIZATION OF HIGH TEMPERATURE PLASTICS CONTAINING ARYLMETHYLENE ARYLENE GROUPS AGAINST THERMAL OXIDATIVE DEGRADATION, of Burnett H. Johnson, issued May 10, 1977 there is disclosed that chelates of copper, nickel and cobalt can be usefully employed for the stabilization of high temperature plastics such as polyparabanic acids against thermal oxidative degradation. Examples of compounds which can form chelates with copper are dicarboxylic acids, e.g., malonic acid; diamines, e.g., ethylenediamine and o-phenanthroline; amino acids, e.g., ethylenediamine tetra acetic acid; hydroxy acids, e.g., citric acid; phosphates, e.g., pyrophosphoric acid; nitro acids, e.g., nitroacetic acid; hydroxy aldehydes, e.g., salicylaldehyde; β-diketones, e.g., acetylacetonates; phenols, e.g., 3-hydroxyquinoline and keto esters, e.g., ethylacetoacetate. The patent neither discloses that the copper chelate compounds disclosed therein are useful as UV light absorbers nor discloses copper chelates of 2-hydroxybenzophenones.

It is also well known that certain 2-hydroxybenzophenones are useful as light absorbers. For example, 2-hydroxy-4-methoxy-2'-carboxybenzophenone, 2,2'-dihydroxy-4-methoxybenzophenone, 2-hydroxy-4-methoxy-5-sulfobenzophenone and trihydrate of 2-hydroxy-4-methoxybenzophenone have been commercially sold for use as UV light absorbers to be employed with organic compositions which can degradate upon exposure to light.

Polyparabanic acid compositions and their properties are disclosed in U.S. Pat. Nos. 3,661,859; 3,635,905; 3,547,897 and 3,591,567 which are hereby incorporated by reference in their entirety.

SUMMARY OF THE INVENTION

In accordance with this invention it has been discovered that copper chelates of 2-hydroxybenzophenones surprisingly manifest superior UV light absorbing characteristics as compared with the prior art 2-hydroxybenzophenone UV light absorbers. Accordingly, one aspect of this invention is to provide UV light absorbers which are copper chelates of 2-hydroxybenzophenones.

Another aspect of the present invention relates to organic compositions susceptible to ultraviolet light degradation stabilized against such degradation with a stabilizing amount of a copper chelate of 2-hydroxybenzophenones.

The 2-hydroxybenzophenones are represented by the structural formula:

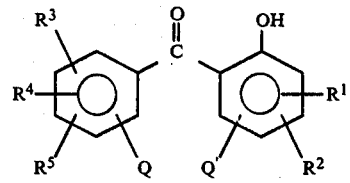

wherein Q and Q', which can be the same or different, each are hydrogen or an organic acid radical capable of forming a salt with copper and wherein Q can be in the 2', 3', 4', 5' or 6' position and Q' can be in the 4, 5 or 6 position, at least one of Q and Q' being hydrogen, $R^1$, $R^2$, $R^4$ and $R^5$ which may be the same or different, each is hydrogen, an alkyl radical having up to 12 carbon atoms, and alkoxy radical having up to 6 carbon atoms, an aryl radical having up to 12 carbon atoms, an aryloxy radical having up to 12 carbon atoms or $R^1$ and $R^2$ and/or $R^4$ and $R^5$ together form trimethylene or tetramethylene and $R^3$ can be hydrogen or hydroxy.

Still another aspect of the present invention is to provide a method of stabilizing an organic composition susceptible to UV light degradation comprising adding to the organic composition a stabilizing amount of a copper chelate of a 2-hydroxybenzophenone.

Yet another aspect of the present invention is to provide a method of stabilizing polymers against degradation upon exposure to light which comprises adding to the polymer composition a stabilizing amount of copper chelates of 2-hydroxybenzophenones. The polymers which may be stabilized against degradation on exposure to UV light can be any polymer in which the copper chelates of the 2-hydroxybenzophenones are generally soluble. Nevertheless, if certain of the copper chelates are not substantially soluble in the polymer they can be disbursed therein by in situ preparation of the chelates. Typical but nonlimiting examples of such polymers are polyparabanic acids, poly(iminoimidazolidinediones), polyurethanes, polyureas, polyesters, polyamides, polyimides, polycarbonates, polyhydantoins and polymers containing one or more moieties characteristic of these polymers.

Another particularly desirable aspect of this invention is to provide polymer films stabilized against degradation upon exposure to UV light by adding to the polymer films a stabilizing amount of copper chelates of 2-hydroxybenzophenones. The copper chelates can be added directly to the casting solution of the polymer or in accordance with a preferred aspect the copper chelates can be prepared in situ, i.e., a copper salt of a weak acid and a 2-hydroxybenzophenone can be added directly to the film casting solution prior to casting the film. After casting the film and during the drying operation, the weak acid will be removed from the cast film along with the casting solvent to produce a copper chelate of the 2-hydroxybenzophenone dissolved or disbursed in the film.

Yet another aspect of the invention is to provide polymer compositions stabilized against degradation upon exposure to light comprising a polymer and a stabilizing amount of copper chelates of 2-hydroxybenzophenones. In accordance with this aspect of the invention, there is preferably provided a polymer composition comprising a polyparabanic acid containing a stabilizing amount of one of a copper chelate of 2-hydroxybenzophenones.

The term "stabilizing amount" as used herein means an amount of a copper chelate of 2-hydroxybenzophenones which is compatible with the organic composition, particularly any polymer composition, to form homogenous composition which will allow the composition to be exposed to UV light over long periods of time without any substantial amount of degradation. Generally, the copper chelate of 2-hydroxybenzophenones will comprise from about 0.1 to about 3.0 wt.% based on the weight of the polymer. However, greater amounts of the copper chelates of 2-hydroxybenzophenones can be employed when desirable up to solubility limit.

The term "2-hydroxybenzophenones" as employed in accordance with this invention is understood to include 2-hydroxybenzophenone and derivatives thereof.

DETAILED DESCRIPTION OF THE INVENTION

It was found that 2-hydroxybenzophenone derivatives sold commercially as UV inhibitors were effective UV inhibitors for polyparabanic acid films. However, it was noted that the thermal oxidative stabilities of the film containing the hydroxybenzophenone UV inhibitors was greatly reduced. It has been discovered that copper chelates of these same 2-hydroxybenzophenone UV inhibitors are substantially more effective than the parent UV inhibitors and, in addition, do not detrimentally affect the high temperature thermal oxidative stabilities of polyparabanic acid films.

The UV inhibitors of this invention are the copper chelates of 2-hydroxybenzophenones. The benzophenone portion of the chelates can be generally represented by the structural formula:

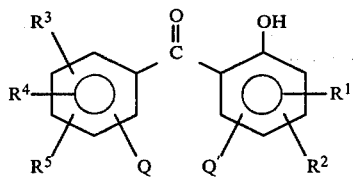

wherein Q and Q', which can be the same or different, each are hydrogen or an organic acid radical capable of forming a salt with copper such as carboxylics, sulfonics and the like and wherein Q can be in the 2', 3', 4', 5' or 6' position and Q' can be in the 4, 5 or 6 position, at least one of Q or Q' being hydrogen, $R^1$, $R^2$, $R^4$ and $R^5$ which may be the same or different, each is hydrogen, an alkyl radical having up to 12 carbon atoms, e.g., methyl, ethyl, propyl, butyl, pentyl and hexyl; heptyl, octyl, nonyl, decyl, undecyl and dodecyl; an alkoxy radical having up to 12 carbon atoms such as methoxy, ethoxy, propoxy, butoxy, pentyloxy, hexoxy, heptoxy, octyloxy, nonoxy, decoxy, undecoxy and dodecoxy, an aryl radical having up to 12 carbon atoms such as phenyl, benzyl, tolyl, napthyl, an aryloxy radical such as phenyloxy, benzyloxy and napthyloxy, or $R^1$ and $R^2$ and/or $R^4$ and $R^5$ together form trimethylene or tetramethylene thereby providing fused rings to the aryl ring of the benzophenone and $R^3$ can be hydrogen or hydroxy.

Preferably, $R^2$, $R^4$ and $R^5$ are hydrogen and $R^1$ is methoxy. More preferably, $R^1$ is in the 4 position of the benzophenone structure. Further it is preferable that Q' is sulfo or carboxy when Q is hydrogen and when Q is sulfo or carboxy, Q' is hydrogen desirably when $R^3$ is hydroxy Q is hydrogen. More desirably when $R^3$ is hydroxy $R^3$ is in the 2' position.

The preferred copper chelates of this invention are 2-hydroxybenzophenone, 2-hydroxy-4-methoxy-5-sulfobenzophenone, 2-hydroxy-4-methoxy-2'-carboxybenzophenone, 2,2'-dihydroxy-4-methoxybenzophenone and 2-hydroxy-4-methoxybenzophenone. Especially preferred copper chelates are 2-hydroxy-4-methoxy-5-sulfobenzophenone and 2-hydroxy-4-methoxy-2'-carboxybenzophenone. The copper chelate of 2-hydroxy-4-methoxy-5-sulfobenzophenone is especially desirable since the compound has a relatively high solubility in casting solutions of polyparabanic acid such that the copper chelate can be synthesized, recovered in pure form and added to the film casting solutions containing a resin in concentrations up to about 3% by weight of the resin.

The copper chelates of this invention are simply prepared by mixing a copper salt of a weak, relatively volatile acid with the particular 2-hydroxybenzophenone in a suitable solvent and after the reactants have equilibrated, displacing the reaction solvent and volatile acid formed using a higher boiling, nonsolvent for the copper chelate.

Suitable but nonlimiting examples of copper salts of weak acids are cupric acetate, cupric formate, cupric carbonate, and the like and preferably cupric acetate.

Suitable reaction solvents for dissolving the copper salt of the weak acid and the 2-hydroxybenzophenone are alcohols such as methanol, ethanol and the like; water, mixtures of alcohols and water, and the like. The solvent should be a good solvent for both reactants and sufficiently volatile enough for easy removal during the displacement of the volatile acid that is formed.

Suitable displacing diluents are those which are soluble in and boil higher than the reaction solvent and the acid formed from the cupric salt and in which the copper chelate is insoluble. The displacing diluent preferably forms an azeotrope with the acid which facilitates essentially complete removal of the acid which in turn drives the equilibrium controlled reaction to completion. This insures high yields of relatively pure copper chelates of 2-hydroxybenzophenones.

The copper salt of the weak acid is typically dissolved in boiling reaction solvent and the particular 2-hydroxybenzophenone is added in increments over a period of time such as for about 30 minutes thereby preventing the reaction mixture from becoming too thick to stir after all the 2-hydroxybenzophenone has been added. The reaction is allowed to proceed for at least 30 minutes.

In the preferred embodiment using cupric acetate as the salt and methanol, as a reaction solvent, chlorobenzene, toluene and bromobenzene are suitable displacing solvents which form azeotropes with acetic acid. Preferably the displacing solvent will be chlorobenzene. As the volume of methanol is reduced under the boiling of the reaction mixture, chlorobenzene or other displacing diluent is slowly added. The boiling point of the mixture will rise to a plateau corresponding to the boiling point of the chlorobenzene-acetic acid azeotrope. After a substantial portion of the acetic acid has been removed the temperature will begin to rise. Thereafter continuous boiling will be maintained until the boiling point of chlorobenzene is achieved and the reaction will be complete and essentially a quantitative yield of the copper chelate will be obtained. Approximately the same volume of chlorobenzene or other displacing solvent will be required as was the initial volume of the methanol or other reaction solvent employed so as to displace all of the reaction solvent and acid.

The mol ratio of copper salt to the particular 2-hydroxybenzophenone depends upon whether the 2-hydroxybenzophenone is monofunctional such as, for example, 2-hydroxy-4-methoxybenzophenone which will form a chelate with copper across the carbonyl and hydroxy radical or difunctional such as, for example, 2-hydroxy-4-methoxy-5-sulfobenzophenone which will form the same chelate and in addition a salt of the sulfonic acid. With respect to the difunctional benzophenones the mol ratio of copper to benzophenone can be in the range of about 1:0.5 to 2 and preferably from about 1:0.8 to 1.2. Theoretically, a mol ratio of copper to difunctional benzophenone of about 1:1 could result in a chelate polymer of infinite degree of polymerization. With respect to the monofunctional 2-hydroxybenzophenones the mol ratio of copper to benzophenone can be in the range of 1:1 to 2 and preferably about 1:1.8 to 2.

The preparation of UV inhibited organic composition can be accomplished by adding the copper chelate to a solution of the organic composition to be stabilized and thereafter driving the solvent off. As an alternate route for the preparation of the copper chelates and an alternate route for the addition of the copper chelates of this invention to compositions such as polymer film compositions one can employ the "in situ" method for preparation of the copper chelates. This method eliminates the synthesis and recovery steps which are required as described above. Another advantage to the "in situ" method is that certain of the copper chelates are not substantially soluble in polymers such as polyparabanic acid. However, by preparing the copper chelates in situ during casting thin films of polyparabanic acids these insoluble copper chelates can often be molecularly dispersed throughout the film.

In accordance with the "in situ" aspect, a suitable solvent is employed which will dissolve the copper salt, the particular 2-hydroxybenzophenone and the polymer product such as polyparabanic acid. Suitable solvents are, for example, the organic amide solvents which are liquid above 10° C. and generally from about 20° C. to about 270° C. Illustrative of such organic amide solvents are: N,N-dimethylformamide, N,N-diethylformamide, N,N-dimethylacetamide, N,N-diethylacetamide, N,N-dimethylpropionamide, N,N-dimethylbutyramide, N-methylpyrrolidone, N-ethylpyrrolidone, hexamethylphosphoramide and dimethyl sulfoxide. Preferably the solvent of choice is N,N-dimethylformamide.

The preparation of copper chelates which are soluble in the organic composition, for example, the polyparabanic acid composition, and more particularly, films of polyparabanic acid, is simply accomplished by adding in the preferred ratios cited above, the copper salt of a weak and the particular 2-hydroxybenzophenone to the casting solvent, for example, dimethylformamide, in amounts which will form a stabilizing amount of copper chelate of the benzophenone, thereafter adding the organic composition such as polyparabanic acid to the casting solvent, allowing the reaction of the copper salt with the benzophenone to equilibrate, casting the resulting solution into a film on a suitable surface and heating the film to remove the solvent and weak acid leaving a dry film containing the copper chelate. In the alternative the polyparabanic acid can be added to the casting solvent prior to the addition of the copper salt and the particular 2-hydroxybenzophenone. It is preferred to add the copper salt and the 2-hydroxybenzophenone to the casting solvent prior to the addition of the resin since the two components can be stirred and dissolved more quickly than if added to a viscous casting solution.

When it is desired to use a copper chelate of 2-hydroxybenzophenone that is not soluble in the casting solution, cupric acetate is first dissolved in the casting solvent, after which the appropriate amount of polymer is added and dissolved and finally the 2-hydroxybenzophenone is added to the now viscous polymer solution. Quite often the resulting copper chelate will remain essentially in solution due to the very slow process of precipitation from a viscous solution.

Generally, the amount of polymer composition added to the casting solvent will be in the range from about 1 to about 50% by weight of polymer to dimethylformamide and preferably from 5 to 35%.

The copper chelates prepared in accordance with this invention can be usefully employed in any organic composition which composition upon exposure to light would undergo embrittlement or degradation. The only limitations on the usefulness of the copper chelates are that the chelates be reasonably soluble in the organic composition or can be prepared in situ with the organic composition and that the copper chelates have no adverse affects on the organic composition. Illustrative of compositions which may usefully be inhibited against the detrimental affects of exposure to UV light are organic gelatin compositions, thermosets such as polyurethanes, polyureas, and the like and thermoplastics such as polyparabanic acids, polyhydantoins, polyimides, and the like and in their coatings, articles and films.

Desirably the UV inhibitors of this invention will be employed with high performance plastics such as, for example, polyparabanic acids, poly(iminoimidazolidinediones), polyurethanes, polyureas, polyesters, polyamides, polyimides, polycarbonates, polyhydantoins and polymers containing one or more moieties characteristic of these polymers. Preferably the UV inhibitors of this invention are employed in combination with poly(iminoimidazolidinediones), polyparabanic acids and copolymers of these. Most preferably the polymers of choice are the polyparabanic acids containing one or more units of:

wherein Z is:

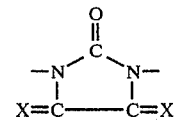

X=O or NH, provided at least one X is O, R is an organic moiety selected from the group consisting of aliphatic radicals, alicyclic radicals, aromatic radicals or mixtures thereof and N is sufficiently large to produce a solid product. Most preferably the polymer compositions usefully employed in accordance with this invention will be poly[1,4-phenylenemethylene-1,4-phenylene-1,3-(imidazolidine-2,4,5-trione)] which is also designated in Chemical Abstracts as poly[2,4,5-trioxo-1,3-imidazolidinediyl)-1,4-phenylenemethylene-1,4-phenylene] which can be generally represented by the structure:

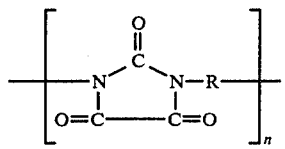

wherein R is methylenediphenyl. It will be recognized, however, that other polyparabanic acids and copolymers thereof as described in several of the above-referenced U.S. Patents may be stabilized in the same manner as exemplified herein.

In accordance with this invention the method of preparing the UV stabilized compositions is accomplished by merely adding the copper chelate of the 2-hydroxybenzophenones to the organic composition in a solution or in the form of a melt and thoroughly mixing the same. With respect to the film preparation it is highly desirable as described to form the copper chelates of this invention in situ.

The UV stabilized organic compositions in this invention will contain a stabilizing amount of the copper chelate of the 2-hydroxybenzophenones. For each composition it can be readily determined by those of ordinary skill in the art as to that amount which will be required to stabilize the composition against UV degradation. With respect to the polymer compositions the copper chelates of the 2-hydroxybenzophenones can be present in an amount of from about 0.1 to about 3.0 wt.% based on the weight of the polymer and preferably in an amount of from 0.5 to about 1.5 wt.%.

The invention is further described by the following examples.

EXAMPLE 1

Three separate casting solutions comprising 80 gms of N,N-dimethyl formamide as the solvent and 20 g of polyparabanic acid having the repeating unit:

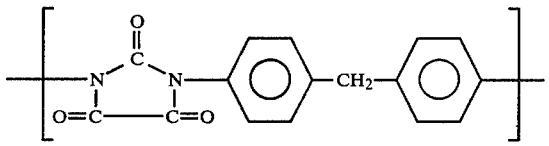

were prepared. To the first solution there was added sufficient amount of the copper chelate of 2-hydroxy-4-methoxy-2'-carboxybenzophenone to provide the finally prepared film with 0.50 wt.% of the copper chelate (Film A). To the second prepared film there was added a sufficient amount of 2-hydroxy-4-methoxy-2'-carboxybenzophenone to provide the finally prepared film with 0.50 wt.% of the UV light absorber (Film B). No UV light absorber was added to the third solution (Film C). The casting solutions were each cast onto a smooth surface, and dried to remove the dimethyl formamide and removed from casting surface as free film. The solutions were cast to provide a 25 micron thick polyparabanic acid film. The films were exposed to UV light for a total of 1344 hours in a weatherometer at 60° C., 50% humidity, utilizing a 6500 watt xenon burner light source. Propagating tear strength measurements were made after 336 hours, 672 hours and 1344 hours to determine the relative rates of film degradation (ASTM D-1938). The results are summarized in Table I.

The results show that the unstabilized film failed after 1344 hours of light exposure, the film stabilized with the 2-hydroxybenzophenone compound had dropped to 45% of tear strength but by contrast, the film containing the copper chelate did not lose any toughness after the initial loss of 10%. The results are sumarrized in Table I.

TABLE I

| Film | % Retention of Propagating Tear Strength | | | |
|---|---|---|---|---|
| | 0 hours* | 336 hours* | 672 hours* | 1344 hours* |
| A | 100 | 90 | 90 | 90 |
| B | 100 | 83 | 83 | 45 |
| C | 100 | 63 | 33 | less than 1% |

*hours exposure to xenon light source

EXAMPLE 2

This example illustrates that copper chelate of 2,2'-dihydroxy-4-methoxybenzophenone is a superior UV light absorber than 2,2'-dihydroxy-4-methoxybenzophenone.

Two separate casting solutions were prepared as in Example 1 except that one film contained 0.50 wt.% of the copper chelate of 2,2'-dihydroxy-4-methoxybenzophenone whereas the other contained 0.50 wt.% the 2,2'-dihydroxy-4-methoxybenzophenone. The films were cast and exposed to UV light and the percent retention of propagating tear strength was determined in the manner as described in Example 1. The percent of retention of the film containing the copper chelate dropped to 90% retention upon exposure to the light source for 1008 hours whereas the film containing the conventional UV light absorber dropped to 68%.

EXAMPLE 3

This Example illustrates a method of preparing the copper chelates of this invention.

One hundred grams of cupric acetate is dissolved in a liter of boiling methanol. 170 g of 2-hydroxy-4-methoxy-5-sulfobenzophenone is added in small increments over 30 minutes to the copper acetate solution. A green precipitate was formed. The reaction was permitted to proceed for 30 minutes after all the benzophenone was added. To the boiling solution is slowly added chlorobenzene as the displacing diluent to displace methanol and acetic acid. Upon displacement of the methanol and acetic acid there remained a yellow precipitate. The product was recovered by filtration and reslurried several times. The product contained approximately 16.5% by weight of copper (x-ray flourescence analysis). The yield was 95% of theoretical.

EXAMPLE 4

This Examples illustrates a method of preparing the copper chelates of this invention in situ during casting of a polyparabanic acid film. The polyparabanic acid is of the type PPA-M as described in U.S. Pat. No. 4,105,616 of Patton, issued Aug. 8, 1978, 0.12 g of acetate was dissolved in 80 gms of N,N-dimethylformamide, the casting solvent of choice for polyparabanic acid. To the cupric acetate-dimethylformamide solution there was slowly added 0.20 gms of 2-hydroxy-4-methoxy-5-sulfobenzophenone. The solution was stirred until the equilibration of chelate formation was complete. At this stage the dimethylformamide contains the completely dissolved equilibrium polymeric copper chelate of the benzophenone along with some cupric acetate and same non-chelated benzophenone. To the solution is added 20 g of the polyparabanic acid and the mixture is completely dissolved. The viscous solution is cast so as to form a dry film of 25 microns thick. The film was dried. During the drying operation the distinct odor of acetic acid was noted.

The films stood up well on exposure to UV light.

What is claimed is:

1. Copper chelates of 2-hydroxy-4-methoxy-5-sulfobenzophenone and 2-hydroxy-4-methoxy-2'-carboxybenzophenone.

2. A stabilized polymer composition comprising polymers selected from the group consisting of polyparabanic acid, poly(iminoimidazolidinediones, polyurethanes, polyureas, polyesters, polyamides, polyimides, polycarbonates, polyhydantoins and polymers containing one or more moieties characteristic of these polymers and a stabilizing amount of a copper chelate of 2-hydroxy-4-methoxy-5-sulfobenzophenone or 2-hydroxy-4-methoxy-2'-carboxybenzophenone.

3. The polymer composition of claim 2 wherein the polymers are polyparabanic acids.

4. The polymer composition of 3 wherein the copper chelate is a copper chelate of 2-hydroxy-4-methoxy-2'-carboxybenzophenone.

5. The polymer composition of claim 3 wherein the copper chelate is a copper chelate of 2-hydroxy-4-methoxy-5-sulfobenzophenone.

6. The polymer composition of claim 2 wherein said polymer is in the form of a film.

7. A polymer composition stabilized against degradation comprising a polymer containing one or more units of:

wherein Z is:

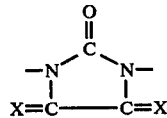

X=O or NH, provided at least one X is O, R is an organic moiety selected from the group consisting of aliphatic radicals, alicyclic radicals, aromatic radicals or mixtures thereof and n is sufficiently large to produce a solid product and a stabilizing amount of copper chelates of 2-hydroxy-4-methoxy-5-sulfobenzophenone or 2-hydroxy-4-methoxy-2'-carboxybenzophenone.

8. The polymer composition of claim 7 wherein a copper chelate is a copper chelate of 2-hydroxy-4-methoxy-2'-carboxybenzophenone.

9. The polymer composition of claim 7 wherein the copper chelate is a copper chelate of 2-hydroxy-4-methoxy-5-sulfobenzophenone.

10. A method of stabilizing polymers selected from the group consisting of polyparabanic acids, poly(iminoimidazolidinediones), polyurethanes, polyureas, polyesters, polyamides, polyimides, polycarbonates, polyhydantoins and polymers containing one or more moieties characteristic of these polymers comprising adding to the polymer a stabilizing amount of a copper chelate of 2-hydroxy-4-methoxy-5-sulfobenzophenone or 2-hydroxy-4-methoxy-2'-carboxybenzophenone.

11. The method according to claim 10 wherein the polymers are polyparabanic acids.

12. The method of claim 10 wherein said polymer is in the form of a polymer film.

13. The method of claim 12 wherein the polymer is a polyparabanic acid.

14. A method of stabilizing a polyparabanic acid film against degradation on exposure to UV light comprising:

(a) preparing a casting solvent for a polyparabanic acid, (b) adding a copper salt of a weak acid and either 2-hydroxy-4-methoxy-5-sulfobenzophenone or 2-hydroxy-4-methoxy-2'-carboxybenzophenone to the casting solvent, said salt and benzophenone being added in an amount which will form a stabilizing amount of a copper chelate of the benzophenone, (c) adding polyparabanic acid to the casting solvent, (d) casting the casting solution to form a viscous film, (e) heating the cast film to remove a solvent and weak acid, and (f) recovering the film.

15. The method of claim 14 wherein the salt is cupric acetate.

16. The method of claim 14 wherein the copper salt of a weak acid and the 2-hydroxybenzophenone are added to the casting solvent prior to the addition of the polyparabanic acid.

* * * * *